United States Patent [19]

Naumann et al.

[11] Patent Number: 4,631,090
[45] Date of Patent: Dec. 23, 1986

[54] PREPARATION AND USE OF IRON MAGNETIC PIGMENTS

[75] Inventors: Rolf Naumann; Lutz Leitner; Jakob Rademachers; Gunter Buxbaum, all of Krefeld, Fed. Rep. of Germany

[73] Assignee: Bayer Aktiengesellschaft, Leverkusen, Fed. Rep. of Germany

[21] Appl. No.: 740,090

[22] Filed: May 31, 1985

[30] Foreign Application Priority Data

Jun. 20, 1984 [DE] Fed. Rep. of Germany ....... 3422916

[51] Int. Cl.$^4$ ............. C04B 14/00; C04B 35/26; C01G 49/08
[52] U.S. Cl. ................................. 106/304; 252/62.56
[58] Field of Search ...................... 106/304; 252/62.56

[56] References Cited

FOREIGN PATENT DOCUMENTS 0063730 11/1982 European Pat. Off. ......... 252/62.56

Primary Examiner—Theodore Morris
Attorney, Agent, or Firm—Sprung Horn Kramer & Woods

[57] ABSTRACT

A magnetic pigment consisting essentially of iron, having an X-ray crystallite size with the 110 reflex of from 14 to 22 nm, a coercive force from 55 to 88 kA/m and a switching field distribution of the oriented pigment particles of less than 0.55 is produced by precipitating an iron (II)-salt with a super-stoichiometric quantity of an aqueous alkali metal carbonate solution and oxidizing it to produce $\alpha$-FeOOH, $\gamma$-Fe$_2$O$_3$, Fe$_3$O$_4$ or betholoid iron oxides, subsequently reducing it to the metal, and providing the iron oxides or oxide hydroxides with an inorganic protection from sintering at the latest during reduction.

14 Claims, No Drawings

PREPARATION AND USE OF IRON MAGNETIC PIGMENTS

This invention relates to magnetic pigments consisting essentially of iron having a X-ray crystallite size with the 110 reflex of from 14 to 22 nm, to a process for the production thereof and to the use thereof for the production of magnetic data carriers.

The use of magnetic iron pigments for conventional magnetic recording systems has been examined for some time without much success, despite the higher recording density to be achieved in comparison with oxidic pigments.

The coercive forces of the metal pigments of from 50 to 80 kA/in in the magnetic data carrier required for these uses have hitherto been obtained by the following methods:
- by alloying the iron pigment with up to about 30 atom % of nickel,
- by nitriding highly-coercive iron pigments to produce low-coercive $Fe_4N$; and
- by producing large particulate long-needled iron pigment.

However, all the above methods suffer from serious disadvantages, such as the toxicity of the nickel, the poor reproducibility of the $Fe_4N$ and the unacceptable tape background noise due to the large particulate nature of the iron pigment.

A further method for providing iron pigments having the required properties involves reducing the coercive force by shortening the pigment needles, the pigments simultaneously being smaller. However, this method has hitherto meant that the switching field distribution which is important for the recording properties is damaged too seriously when the needles are shortened.

Thus, an object of the present invention is to provide magnetic pigments consisting essentially of iron, which have all the required characteristics without suffering from the disadvantages of the pigments produced by the above methods.

These requirements are met by magnetic pigments consisting essentially of iron having a X-ray crystallite size with the 110 reflex of from 14 to 22 nm, the coercive force of which is from 55 to 88 kA/m and the switching field distribution of the aligned pigments is less than 0.55.

In a preferred embodiment, the pigments according to the present invention contain from 1 to 6%, by weight, preferably from 1.5 to 4%, by weight, of $SiO_2$, based on iron. A particularly preferred embodiment of the pigments is characterized in that they additionally contain from 0.5 to 4.5%, by weight, $Al_2O_3$, based on iron.

These pigments which are, on the one hand, low-coercive, and are simulatenously fine-particulate and have and exceptionally good switching field distribution are obtained if starting materials are used in the production thereof which have been produced by the carbonate precipitation process.

The pigments according to the present invention are thus obtained by precipitating an iron(II) salt with a superstoichiometric quantity of an aqueous alkali metal carbonate solution and oxidizing it to produce α-FeOOH, optionally coverting it to form $\gamma$-$Fe_2O_3$, $Fe_3O_4$ or bertholoid iron oxides and subsequently reducing them to the metal, the iron oxides or oxide hydroxides having an inorganic sintering protection at the latest during reduction.

The alkaline precipitation by soda during production of goethite is described in DE-A 21 62 716, but the oxidic magnetic pigments produced therefrom are not superior to those produced by other processes.

If the goethite pigments produced in this manner are provided with sufficient protection from sintering in the form of $SiO_2$ and, optionally, $Al_2O_3$, precursor compounds for the production of magnetic metal pigments having outstanding properties are surprisingly obtained.

A further object of the present invention is a process for the production of the present pigments. This process is characterized in that iron(II) salts are precipitated with a superstoichiometric quantity of an aqueous alkali metal carbonate solution and oxidized to produce α-FeOOH, optionally converted to produce $Fe_2O_3$, $Fe_3O_4$ or bertholoid oxides, and reduced to the metal, the iron oxides or oxide hydroxides being provided with a coating of silicon-containing compounds, at the latest during the reduction.

It is immaterial by which process the silicon-containing compounds are applied to the iron oxides to be coated. The teaching known from GB-PS No. 1,122,637, DE-OS No. 2,162,716 and DE-OS 2,202,853, combinations thereof or other possible processes may be used for this purpose. The protection from sintering provided by this coating is particularly effective if the silicon-containing compounds are added in a quantity such that the reduced pigment has an $SiO_2$ content of from 1 to 6%, by weight, preferably from 1.5 to 4%, by weight.

Likewise, it is unimportant in which form the iron oxide pigments are used for reduction to the metal, that is whether in the form of $Fe_2O_3$, $FeO_x$ ($1.33<x<1.5$) or as FeOOH.

However, it is particularly advantageous if soluble aluminum-containing compounds are added in the production of the starting material during precipitation of the α-FeOOH or to the α-FeOOH in a quantity such that the reduced pigment has an $Al_2O_3$ content of from 0.5 to 4.5%, by weight.

A further object of the present invention is the use of the present pigments for the production of magnetic data carriers. The consistently good quality of these data carriers may be ensured by providing the pigments with an oxide coating before they are incorporated into the magnetic data carriers.

The present process and the products obtained thereby are illustrated in the following examples which are not intended to limit the inventive concept.

EXAMPLE 1

150 l of a 26.4 kg $FeSO_4$-containing solution are reacted in a solution of 34.3 kg $Na_2CO_3$ in 208.5 kg water at a temperature of 50° C. with vigorous stirring and gasing with 1.8 m³ air/h. After 30 minutes, the temperature is raised to 70° C. and gasing is doubled to 3.6 m³ air/h. The formation of goethite ceases after 3.5 h. The product is filtered off and washed, subsequently treated with 300 l of an aqueous $Na_2SiO_3$ solution (4%, by weight, $SiO_2/\alpha FeOOH$) at 80° C. and the suspension is adjusted to pH 6 by addition of sulphuric acid. The α-FeOOH, which has been subsequently treated is washed and dried and annealed at a temperature of 650° C. to produce α$Fe_2O_3$, reduced to $FeO_4$ at 400° C. in a flow of hydrogen and adjusted to an FeO content of 28% in a flow of air/nitrogen. The product which has been stabilized in this manner is subsequently tempered at 650° C. This product is reduced to the metal at 425° C. with hydrogen (sample A).

EXAMPLE 2

The goethite which was subsequently treated in Example 1 with $SiO_2$ is annealed at a temperature of 750° C. and reduced to the metal as in Example 1 (sample B).

EXAMPLE 3

A goethite is produced as in Example 1, washed and subsequently treated at 80° C. with 3%, by weight, $SiO_2$ (in the form of sodium waterglass) and 0.5%, by weight, $Al_2O_3$ (in the form of aluminum sulphate), and is filtered and washed after being adjusted to pH 6. The product is converted via the intermediate stage $FeO_x$ ($1.33 < x < 1.5$) to the metal, as described in Example 1 (sample C).

EXAMPLE 4

The goethite is produced and subsequently treated as described in Example 1, except that the $FeSO_4$ solution used is augmented with 0.4%, by weight, of aluminum the form of aluminum sulphate. The intermediate is produced and the metal reduction is carried out as described in Example 1 (sample D).

EXAMPLE 5

150 l of an aqueous solution containing 26.4 kg $FeSO_4$ and 388 g aluminum in the form of aluminum sulphate are reacted in a solution of 34.4 kg $Na_2CO_3$ in 208.5 kg water at a temperature of 50° C. with gasing at 1.5 $m^3$ air/h. After 30 min, the temperature is raised to 70° C. and, on reaching a degree of oxidation of 90%, 4%, by weight, $SiO_2$ in the form of sodium waterglass) is added and oxidation is continued until the reaction ends after 3.5 hours. However, the solution is subsequently stirred for a further 2 hours with gasing with air. The product is filtered off, washed and dried and then annealed to produce $\alpha$-$Fe_2O_3$ and reduced to the metal at 425° C. (sample D).

The metal pigments produced according to Examples 1 to 5 are characterized in the following Table 1.

The crystallite size [Λ] is determined by X-ray diffraction on the 110 reflex by the method described in Klug, H. P. and Alexander, L. E. (1974) "X-Ray Diffraction Procedures" Verlag Wiley, New York The BET surface area is determined by the BET-method using nitrogen adsorption at a temperature of $-195.8°$ C. in the single-point process without previous heating.

The coercive force of the magnetic powder, the coercive force [IHc] and the alignment [$B_r/B_m$] in the magnetic tape are determined with a measuring field of 278.5 kA/m. The switching field distribution [sfd] of the magnetic tapes are recorded by differentiation of the hysteresis with a field modification of 0.398 kA/m sec.

The above is evaluated by calculating the quotient:

$$sfd = \frac{\text{Width of the Gaussean curve at half height}}{\text{Field at the curve maximum}}$$

EXAMPLE 6

A mixture of 180 l $FeSO_4$-solution containing 26.4 kg $FeSO_4$ and 1796 ml $Al_2(SO_4)_3$-solution containing 54 g/l Al is reacted with 34.4 kg $Na_2CO_3$ in 172 l solution at 45° C. heated to 50° C. and oxidized with 1 $m^3$/h air. The reaction product is filtered and washed and subsequently treated with 2.5 weight % $SiO_2$ as $Na_2SiO_3$, acidified to pH 5.6 and washed. The dried powder was annealed at 750° C. and then reduced to metal (Sample F).

EXAMPLE 7

26.4 kg $FeSO_4$ and 34.4 kg $Na_2CO_3$ are reacted at 45° C. in 352 l solution, heated to 60° C. and oxidized with 1.5 $m^3$/h air the washed reaction product was treated with 2.5% $SiO_2$ (as $Na_2SiO_3$) and 0,5% $Al_2O_3$ (as $Al_2(SO_4)_3$) washed and dried, annealed at 750° C. and reduced to metal at 425° C. (Sample G).

EXAMPLE 8

The same mixture like in example 6 is reacted at 50° C. airated with 1.5 $m^3$/h and heated to 70° C. under airation after 60 minutes, at an oxidation rate of about 90% of the Fe(II) 4% $SiO_2$ (by weight calculated to Fe) in form of sodium water glass are added and oxidation is continued for 3 hours. The washed and dried material is heated to 750° C. and subsequently reduced to metal (Sample H). The metal powder is partially oxidized by contacting it with air/nitrogen mixtures to receive an air-stable product (Sample H1).

TABLE 1

Characterization of the metal pigments according to the present invention

| Sample | Λ [nm] | BET-surface area [$m^2$/g] | Coercive force of the powder [kA/m] | Testing of laboratory tape $I^H c$ | | |
|---|---|---|---|---|---|---|
| | | | | [kA/m] | $B_r/B_m$ | sfd |
| A | 16.5 | 45 | 61.7 | 80.0 | 0.74 | 0.50 |
| B | 16.0 | 47 | 61.0 | 82.0 | 0.74 | 0.49 |
| C | 17.0 | 55 | 61.0 | 79.8 | 0.74 | 0.48 |
| D | 15.0 | 51 | 65.7 | 85.9 | 0.76 | 0.53 |
| E | 16.5 | 50 | 66.4 | 81.1 | 0.80 | 0.41 |
| F | 18.5 | 52 | 60.2 | 69.4 | 0.77 | 0.43 |
| G | 20.0 | 48 | 79.7 | 80.4 | 0.81 | 0.40 |
| H | 16.5 | 42 | 68.7 | — | — | — |
| H1 | — | — | — | 75.6 | 0.80 | 0.39 |

It will be understood that the specification and examples are illustrative but not limitative of the present invention and that other embodiments within the spirit and scope of the invention will suggest themselves to those skilled in the art.

We claim:

1. A magnetic pigment consisting essentially of iron, having a X-ray crystallite size with the 110 reflex of from 14 to 22 nm, a coercive force from 55 to 88 kA/m and a switching field distribution of aligned pigment particles of less than 0.55.

2. A pigment according to claim 1, containing from 1 to 6% of $SiO_2$ based on the weight of iron.

3. A pigment according to claim 1, containing from 0.5 to 4.5% of $Al_2O_3$ based on the weight of iron.

4. A pigment according to claim 1 containing from 1.5 to 4% of $SiO_2$ based on the weight of iron.

5. A pigment according to claim 4, containing from 0.5 to 4.5% of $Al_2O_3$ based on the weight of iron.

6. A process for producing a pigment according to claim 1, comprising precipitating an iron (II) salt with a super-stoichiometric quantity of an aqueous alkali metal carbonate solution conducting oxidizing to produce $\alpha$-FeOOH, subsequently reducing the $\alpha$-FeOOH to the metal, and wherein the $\alpha$-FeOOH is provided with an inorganic protection from sintering at the latest during reduction by applying a silicon-containing compound or an aluminum containing compound to the α-FeOOH.

7. A process according to claim 6, wherein the inorganic protection comprises a coating of $SiO_2$.

8. A process according to claim 6, wherein the silicon-containing compound is added in a quantity such that the reduced pigment has an $SiO_2$ content of from 1 to 6% by weight.

9. A process according to claim 6, wherein the inorganic protection is provided by adding a soluble aluminum-containing compound during precipitation of the α-FeOOH or to the α-FeOOH in a quantity such that the reduced pigment has an $Al_2O_3$ content of from 0.5 to 4.5% by weight.

10. A process according to claim 6, wherein the silicon-containing compound is added in a quantity such that the reduced pigment has an $SiO_2$ content of from 1.5 to 4% by weight.

11. A process according to claim 10, wherein a soluble aluminum-containing compound is added during precipitation of the α-FeOOH or to the α-FeOOH in a quantity such that the reduced pigment has an $Al_2O_3$ content of from 0.5 to 4.5% by weight.

12. A magnetic data carrier comprising a magnetic iron pigment according to claim 1.

13. A carrier according to claim 12, wherein the pigment particles carry an oxide sheath.

14. A process according to claim 6, which further comprises converting the α-FeOOH to α-$Fe_2O_3$, $Fe_3O_4$ or betholoid iron oxides and subsequently reducing the γ-$Fe_2O_3$, $Fe_3O_4$ or betholoid iron oxides to the metal, and wherein the γ-$Fe_2O_3$, $Fe_3O_4$ or betholoid iron oxides are provided with an inorganic protection from sintering at the latest during reduction by applying a silicon-containing compound or an aluminum containing compound to the γ-$Fe_2O_3$, $Fe_3O_4$ or betholoid iron oxides.

* * * * *